UNITED STATES PATENT OFFICE.

DANIEL M. SPROGLE, OF ANNAPOLIS, MARYLAND, AND JAMES D. PIERCE, OF MILWAUKEE, WISCONSIN.

IMPROVEMENT IN THE MANUFACTURE OF ARTIFICIAL STONE.

Specification forming part of Letters Patent No. 130,953, dated August 27, 1872.

*To all whom it may concern:*

Be it known that we, DANIEL M. SPROGLE, of Annapolis, Anne Arundel county and State of Maryland, and JAMES D. PIERCE, of Milwaukee, in the county of Milwaukee and State of Wisconsin, have invented an Improvement in the Manufacture of Artificial Stone; and we do hereby declare that the following is a full, clear, and exact description thereof.

This invention consists in the use of water, which is highly charged with carbonic-acid gas for mixing compounds containing lime, whereby the induration of such compounds is greatly facilitated.

The following description of my invention will enable others skilled in the art to understand it.

I make a concrete, which is composed of hydraulic lime or cement, sand or gravel, and the scoria or slag from iron-furnaces, which latter is reduced to a proper degree of fineness previous to mixing it with the other substances. These substances are mixed together, in suitable proportions, with water which is impregnated with carbonic-acid gas, which rapidly carbonates the lime or cementing substances, and hardens the compound.

We have produced an excellent artificial stone in the manner above described in a few days without subjecting it to the action of carbonic-acid gas in a kiln; although, if desired, the blocks can be treated to the action of this gas in addition to the carbonated water used in mixing the materials.

We prefer to employ slag as one of the elements of the compound, as it gives very good results. We do not, however, confine ourselves to the use of this substance, as it may be omitted. Nor do we confine ourselves to proportions in combining the substances, as these may vary indefinitely.

Having described our invention, we claim—

The use of carbonated water for mixing substances containing lime in the manufacture of artificial stone.

DANIEL M. SPROGLE.
JAMES D. PIERCE.

Witnesses:
W. R. CRISSEY,
W. ST. JOHN SHERWOOD.